US009869331B2

(12) United States Patent
Muntasser

(10) Patent No.: US 9,869,331 B2
(45) Date of Patent: Jan. 16, 2018

(54) UNIVERSAL MARKING BRACKET

(71) Applicant: Emadeddin Zahri Muntasser, Braintree, MA (US)

(72) Inventor: Emadeddin Zahri Muntasser, Braintree, MA (US)

( * ) Notice: Subject to any disclaimer, the term of this patent is extended or adjusted under 35 U.S.C. 154(b) by 234 days.

(21) Appl. No.: 14/823,349

(22) Filed: Aug. 11, 2015

(65) Prior Publication Data
US 2017/0045070 A1    Feb. 16, 2017

(51) Int. Cl.
| F16L 1/11 | (2006.01) |
| F16B 2/08 | (2006.01) |
| F16B 1/00 | (2006.01) |
| F16L 1/00 | (2006.01) |
| F16B 17/00 | (2006.01) |
| G01V 15/00 | (2006.01) |
| F16L 57/00 | (2006.01) |
| G09F 3/16 | (2006.01) |
| G09F 19/22 | (2006.01) |

(52) U.S. Cl.
CPC ............ F16B 2/08 (2013.01); F16B 1/0071 (2013.01); F16L 1/00 (2013.01); *F16B 17/00* (2013.01); *F16L 1/11* (2013.01); *F16L 57/00* (2013.01); *G01V 15/00* (2013.01); *G09F 3/16* (2013.01); *G09F 19/22* (2013.01); *G09F 19/228* (2013.01)

(58) Field of Classification Search
CPC .......... F16B 17/00; F16B 2/08; F16B 1/0071; G01V 15/00; F16L 1/00; F16L 1/11; F16L 57/00; G09F 3/16; G09F 19/22; G09F 19/228
USPC ....... 116/200, 209; 248/304, 313, 316.1, 65, 248/67.7, 68.1, 69, 70, 74.1, 74.3, 230.8, 248/228.8, 308, 62; 138/107; 33/1 G, 33/1 H
See application file for complete search history.

(56) References Cited

U.S. PATENT DOCUMENTS

| 2,300,673 | A | * | 11/1942 | McD Johns | ........... H01B 17/24 174/149 R |
| 3,012,750 | A | * | 12/1961 | Schermerhorn, Jr. | . A47B 57/56 248/230.9 |
| 3,302,912 | A | * | 2/1967 | Hurlburt, Jr. | ........... F16K 27/00 137/360 |
| 3,539,138 | A | * | 11/1970 | Desroches | ................ F16L 3/00 24/343 |
| 4,268,189 | A | | 5/1981 | Good | |
| 4,309,120 | A | * | 1/1982 | Werthmann | ............ F16B 2/246 16/DIG. 25 |

(Continued)

FOREIGN PATENT DOCUMENTS

| CA | 2 752 360 | 3/2013 |
| DE | 2456467 | 8/1976 |

(Continued)

OTHER PUBLICATIONS

U.S. Appl. No. 14/867,097 Non-Final Office Action dated Apr. 20, 2017.

*Primary Examiner* — R. A. Smith
*Assistant Examiner* — Tania Courson
(74) *Attorney, Agent, or Firm* — Lambert & Associates; Gary E. Lambert; David J. Connaughton, Jr.

(57) ABSTRACT

A universal fastener is provided. The universal fastener is connectable to a buryable element such as a pipe. A marker may be removably attached to the fastener to extend away from the buryable element allowing it to be easily identified once buried.

20 Claims, 2 Drawing Sheets

(56) References Cited

U.S. PATENT DOCUMENTS

| | | |
|---|---|---|
| 4,403,355 A | 9/1983 | Petty |
| D272,987 S * | 3/1984 | Allen .............................. D8/354 |
| 4,742,585 A | 5/1988 | Logsdon |
| 4,957,251 A * | 9/1990 | Hubbard .................... F16L 3/22 |
| | | 248/126 |
| 5,044,303 A | 9/1991 | Culver, Jr. |
| 5,170,973 A * | 12/1992 | Ohta .................... B60G 13/006 |
| | | 248/230.2 |
| 5,320,322 A * | 6/1994 | Williams .................. G09F 7/18 |
| | | 116/173 |
| 5,423,281 A * | 6/1995 | Crookham .............. G09F 17/00 |
| | | 116/173 |
| 5,464,187 A * | 11/1995 | Linkner, Jr. ............ B60R 11/00 |
| | | 248/635 |
| 5,749,548 A | 5/1998 | Tamura et al. |
| 5,771,835 A * | 6/1998 | Schneider ............... G09F 11/23 |
| | | 116/209 |
| 5,799,916 A * | 9/1998 | Lechner .................... F16L 1/24 |
| | | 114/267 |
| 6,065,722 A * | 5/2000 | LeVasseur .............. F21V 21/08 |
| | | 248/218.4 |
| 6,125,786 A | 10/2000 | Jarmyn et al. |
| 6,257,530 B1 * | 7/2001 | Tsai ........................ F16L 3/127 |
| | | 248/73 |
| 6,367,751 B1 * | 4/2002 | Perrott ................. B60G 13/005 |
| | | 248/218.4 |
| 6,481,673 B1 * | 11/2002 | Roe ........................ B60K 13/04 |
| | | 248/300 |
| D473,124 S * | 4/2003 | Wu ................................ D8/356 |
| 6,766,992 B1 * | 7/2004 | Parker .................. F16M 13/022 |
| | | 248/218.4 |
| 6,870,143 B2 | 3/2005 | Martinez et al. |
| 6,941,890 B1 | 9/2005 | Cristo, Jr. et al. |
| 7,186,915 B2 | 3/2007 | Hull et al. |
| D557,117 S * | 12/2007 | Cannaverde .................... D8/354 |
| 7,575,122 B2 | 8/2009 | Hull et al. |
| 7,600,483 B2 * | 10/2009 | Myers ........................ F16L 1/11 |
| | | 116/209 |
| 9,322,492 B2 * | 4/2016 | Conzen ................ F16L 3/1091 |
| D777,024 S * | 1/2017 | Lee ................................ D8/396 |
| 2005/0067545 A1 * | 3/2005 | Coble ...................... F04D 29/601 |
| | | 248/343 |
| 2007/0215165 A1 | 9/2007 | Mazakis |
| 2010/0077954 A1 | 4/2010 | Eigel |
| 2010/0314514 A1 * | 12/2010 | Nelson .................... F16M 11/08 |
| | | 248/219.1 |
| 2011/0017880 A1 * | 1/2011 | Osborn ..................... F16L 3/04 |
| | | 248/74.1 |
| 2013/0056607 A1 | 3/2013 | Mortezazadeh |
| 2016/0010764 A1 * | 1/2016 | Dworak, Jr. .......... F16L 3/1215 |
| | | 248/72 |

FOREIGN PATENT DOCUMENTS

| | | |
|---|---|---|
| DE | 43 15 603 | 12/1993 |
| EP | 1 353 015 | 10/2003 |
| EP | 2 166 391 | 3/2010 |
| WO | 03080960 | 10/2003 |

* cited by examiner

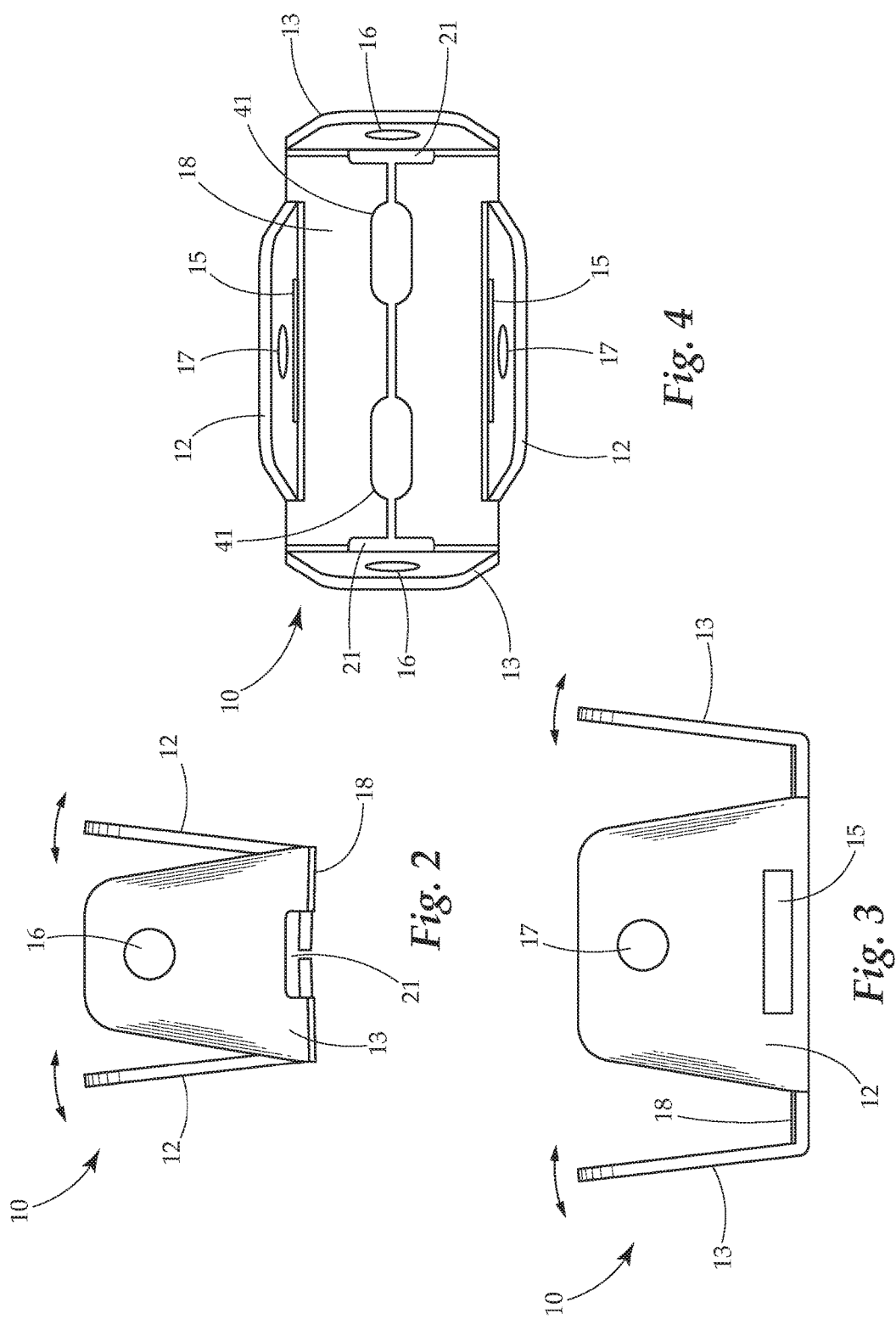

UNIVERSAL MARKING BRACKET

BACKGROUND OF THE INVENTION

Field of the Invention

The present invention relates generally to marking devices. More particularly the present invention relates to a fastener having a receiving area for a marker that can extend through snow, or other coverings, to identify what is beneath.

Description of Related Art

During heavy snow falls, it is common for structural elements such as pipes, housings, access panels, wiring, components, skylights, and the like to be buried. This burying can be caused by falling leaves, soil, snow, other debris, and the like. When buried, these items may become damaged, often substantially if they cannot be seen. This damage may come from, for example, snow removal devices like shovels, blowers, or plows, or by other tools such as rakes, and the like. Contractors and workers making repairs to roofs or fixtures or shoveling snow can trip on these obstructions or even fall to their death through skylights that can be covered with snow. Punctured gas pipes are a major safety and fire hazard.

Therefore, what is needed is a device that may be quickly and easily attached to these potentially buryable structural elements to extend through any burying material to mark that the structural elements are below.

SUMMARY OF THE INVENTION

The subject matter of this application may involve, in some cases, interrelated products, alternative solutions to a particular problem, and/or a plurality of different uses of a single system or article.

In one aspect, a fastener is provided. The fastener is made of a spring steel material with flexible springing properties. The fastener has a base which is connectable to an element (which may be any structure capable of having things attached). The base may connect in any manner to the element such as nails, screws, bolts, clamps, brackets, worm clamps, steel tie-downs, straps, and the like. At least two tabs extend away from the base on opposite sides of the base, each tab extending away from the base at an angle greater than 90 degrees. The tabs being movable between the angle greater than 90 degrees relative to the base and a second angle approximately equal to approximately 90 degrees relative to the base. Each of the at least two tabs defining an aperture through which a marker may pass. The marker is connectable to the fastener by passing through the aperture of each of the two tabs. When the tabs are in a resting position, by virtue of their angling away from each other, the two apertures are not facing each other and the interior tab walls defining the apertures are not aligned. In preparation for inserting the marker into the apertures, the tabs may be squeezed or otherwise urged together to make the apertures more closely face each other and to make the interior tab walls more closely align. Once the marker is inserted, the tabs may be released and will spring back towards their resisting position. The tabs will then exert a pressure on the marker, thereby preventing it from moving or falling.

In another aspect, a fastener assembly is provided. The fastener assembly has a base connectable to an element such as a structural element. Four tabs extend away from the base, two tabs on one set of opposing sides of the base, and the other two tabs on a second set of opposing sides of the base. Each of the four tabs extend away from the base at an angle greater than 90 degrees relative to the base. The tabs are movable between the angle greater than 90 degrees relative to the base and a second angle approximately equal to 90 degrees relative to the base. Further, each of the four tabs defines an aperture through which a marker may pass. A marker may be frictionally connected to the tabs by being held by an interior wall of each aperture. The marker extends away from the fastener and the element to which the base may be connected. In this configuration, if the element to which the fastener is connected becomes buried, the marker will continue to extend away from it, alerting that there is a buried element beneath.

BRIEF DESCRIPTION OF THE DRAWINGS

FIG. 2 provides a side elevation view of an embodiment of the present invention.

FIG. 3 provides a side elevation view of an embodiment of the present invention.

FIG. 4 provides a top elevation view of an embodiment of the present invention.

DETAILED DESCRIPTION

Figure 1:
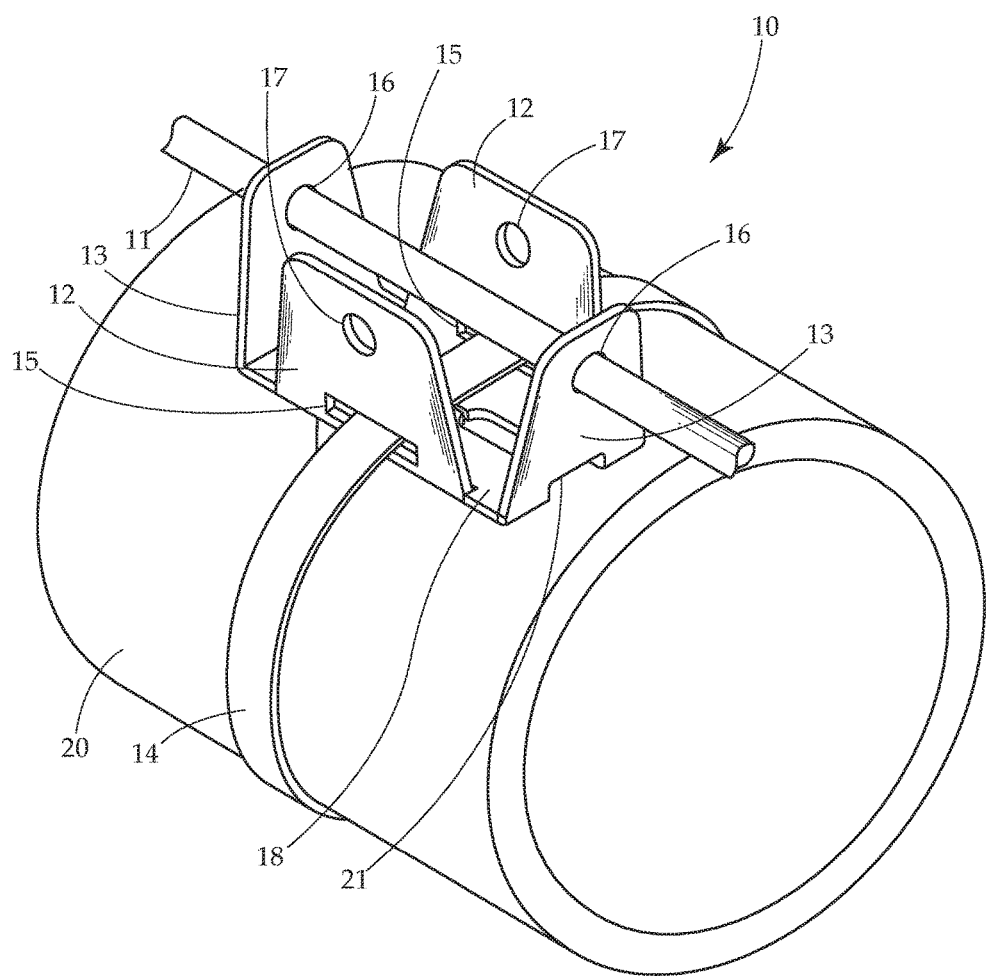
FIG. 1 provides a perspective view of an embodiment of the present invention.

The detailed description set forth below in connection with the appended drawings is intended as a description of presently preferred embodiments of the invention and does not represent the only forms in which the present invention may be constructed and/or utilized. The description sets forth the functions and the sequence of steps for constructing and operating the invention in connection with the illustrated embodiments.

Generally, the present invention concerns a fastener and marker assembly configured to be fastened or otherwise attached to a buried, or buryable, element, with the marker extending out of the burying material. In one embodiment, the fastener may have extended regions, such as tabs that are configured to removably receive the marker. In a particular embodiment, the extended regions, or the areas connecting them to a base of the fastener, may be flexible, such that they may be flexed to receive and release the marker received therein and held in pace by a frictional force. Further, the fastener may have a number of connection structures, allowing it to be a universal fastener, fastenable to a number of different surfaces and structures in a number of different ways. As such, the marker may be able to extend out of the burying material at multiple different angles and directions. However, it should be understood that the present invention may have any number of structures to achieve a similar function without straying from the scope of the invention.

Turning now to FIG. 1, an embodiment of the universal fastener assembly is provided. The fastener 10 has a base 18, and four extending tabs, two widthwise tabs 13 and two lengthwise tabs 12. These tabs are angled upward from base 18, and extend at angles greater than ninety degrees away from the base relative to the base. In another embodiment, the tabs 12, 13, may extend from the base 18 at an angle such that they have an included angle relative to the opposing tab of 20-25 degrees. However it should be understood that the tabs may extend at any number of angles away from the base and relative to each other. In one embodiment, the tabs may extend such that they have included angles relative to each other anywhere from 0 to 180 degrees in either direction. Tabs may even extend inward towards each other.

In a particular embodiment, the entire fastener 10 may be made of spring steel or other material having a high yield strength. In a particular embodiment, the spring steel contemplated herein may have a yield strength ranging from approximately 50-150 ksi. As such, the tabs 12, 13 may be flexed relative to each other and the base 18, and may return to their original shape. In another embodiment, a section connecting the tabs 12, 13, to the base 18 may be formed of spring steel or other material having a high yield strength.

Each tab 12, 13, is shown to define an aperture 16, 17, through which a marker 11 may pass. Here, marker 11, shown as an elongate rod, is attached to fastener 10 by passing through apertures 16 of each tab 13. It should be understood that in another embodiment, the marker 11 may pass through apertures 17 of tabs 12. In the embodiment shown, the marker 11 is held in place frictionally, by the tabs 13 being slightly angled away from a 90 degree angle relative to the base. These tabs 13 and their angle apply a force against the marker 11 by the aperture inside walls (which are the surfaces of the tabs defining the aperture), which frictionally hold the marker 11 in place. This force by the tabs 13 is caused by the springing property of the material causing the tabs to be urged back to their resting position which is slightly angled away (in this embodiment). This movement is prevented by the presence of the marker. To remove the marker 11, in one embodiment, a user may pinch the tabs 13 inward towards each other to an angle closer to ninety degrees than they are when at rest. This will release some or all force applied to the marker 11 by the aperture inner walls, lessening the frictional connection between marker 11 and tabs 13, allowing the user to remove the marker 11 (or letting it fall by gravity).

Tabs 12 further each define a slot 15. Through each slot 15 is passed a band 14. Band 14 allows the fastener 10 to be attached to an element, such as a buried or buryable element, around which the band 14 can be wrapped. For example, band 14 may be wrapped around a pipe 20, conduit, or other relatively small item. In varying embodiments, band 14 may be made larger or smaller depending on the size of the item the fastener is to be attached to. The band 14 may further have a fastener or clamp to allow it to be opened and closed, and removed from the fastener 10. Band 14 may be elastic, allowing it to fit over various sized elements. Also, band 14 may be adjustable in length such as a worm clamp or metal tie-down. Similarly, tabs 13 each define a slot 21, through which a band or similar connector may be passed to hold the fastener 10 in place.

The marker 11 may be connected to the fastener 10 in any manner. For example, in other embodiments the marker 11 may be threaded and the apertures 15, 16 may be similarly threaded to receive the marker 11. In other embodiments, only one of the apertures 15, 16 may be threaded, with the other being one of a non-threaded aperture, and a seat, among other configurations. In other embodiments, the marker 11 may be non-threaded, and may attach to at least one of the tabs 12, 13 in any manner. It should be understood, however, that the marker 11 may be attached to the fastener in any manner without straying from the scope of the present invention.

FIG. 2 shows another embodiment of the present invention in a side elevation view. Here, the fastener 10 widthwise tabs 13 and lengthwise tabs 12 can be seen. Arrows indicate the flexible movement ability of lengthwise tabs 12. Tabs 13 have similar flexing movement ability, better visualized in FIG. 3. Tabs 12, 13 extend upwards from base 18. Central portions of the base 18 can be seen to slightly angle upward, though may be flat, or any other shape. In a particular embodiment, the central portions may form an included angle of approximately 180-155 degrees. This may help the fastener attach to a rounded surface. However, it should be understood that this angle may vary depending on embodiment and desired use. An opening near a center of the base 18 extends from one side to the other. Tabs 13 each define an aperture 16 through which a marker (not shown) may pass. Tabs 13 further define slot 21, through which a band or similar connector may be passed to hold the fastener 10 in place.

FIG. 3 provides another embodiment of the present invention in a side elevation view. Here, the fastener 10 lengthwise tabs 12 and widthwise tabs 13 can be seen. Arrows indicate the flexible movement ability of widthwise tabs 13. Tabs 12 have similar flexing movement ability, better visualized in FIG. 2. Tabs 12, 13 extend upwards from base 18. Tabs 12 each define an aperture 17 through which a marker (not shown) may pass. Tabs 12 further define slot 15, through which a band or similar connector may be passed to hold the fastener 10 in place.

FIG. 4 provides an elevation view of another embodiment of the present invention. In this view, the top of the fastener 10 can be seen. The fastener 10 has a base 18, and four extending tabs, two widthwise tabs 13 and two lengthwise tabs 12. The base 18 defines openings 41. These openings 41 can be used to pass elements such as screws, bolts, nails, and the like, wherein the head of such elements holds the fastener 10 to a surface. The lengthwise and widthwise tabs 12, 13, are angled upward from base 18, and extend at angles greater than ninety degrees away from the base. However, as noted above, the angle may vary relative to the base and may include a right angle (ninety degrees) to the base.

As noted, in varying embodiments, the tabs 12, 13 may be flexed relative to each other and the base 18 and may return to their original shape. This may be achieved by the entire fastener, or at least connections between the tabs and 12, 13 and base 18 being made of a flexible material. However, this movement of the tabs 12, 13 relative to the base may be achieved in any manner, including a hinged connection, or any other structure allowing such movement.

Each tab 12, 13, is shown to define an aperture 16, 17, through which a marker (not shown) may pass. In one embodiment, the marker (not shown) may be held in place frictionally by the tabs 12, 13 being slightly angled away from a 90 degree angle relative to the base. These tabs 12, 13 and their angle apply a force against the marker by the aperture inside walls (which are the surfaces of the tabs defining the aperture), which frictionally hold the marker in place. Tabs 12 further each define a slot 15. Through each slot 15 is passed a band 14. Band 14 allows the fastener 10 to be attached to an element, such as a buried or buryable element, around which the band 14 can be wrapped. For example, band 14 may be wrapped around a pipe, conduit, or other relatively small item. In varying embodiments, band 14 may be made larger or smaller depending on the size of the item the fastener is to be attached to. The band may further have a fastener or clamp to allow it to be opened and closed, and removed from the fastener 10. Similarly, tabs 13 each define a slot 21, through which a band or similar connector may be passed to hold the fastener 10 in place.

The fastener may be made of any material or combination of materials resilient enough to be attached to a surface and to hold a marker in place to extend away from the fastener. In embodiments having flexibility between tabs and the base, the fastener may be made of a flexible material having a high yield strength, or in another embodiment, material joining the base to the tabs may be made of a flexible material having a high yield strength. Generally, the present invention may be made of metals, plastics, composites, woods, and the like.

The universal fastener of the present invention may be used in any manner capable of attaching the fastener to an element and allowing a marker to extend away from the element. In a particular embodiment, the fastener may be connected to a pipe by a band. A user may then pinch in two opposing tabs towards each other. While pinching in, an elongate shaft marker may be passed through apertures of both opposing tabs. The marker may be positioned to extend away from the element to which the fastener is attached. Once properly positioned between the two apertures of the tabs, the user may release the tabs. They will return to or close to their resting positions, applying a frictional force to the marker and thereby holding it in place.

While several variations of the present invention have been illustrated by way of example in preferred or particular embodiments, it is apparent that further embodiments could be developed within the spirit and scope of the present invention, or the inventive concept thereof. However, it is to be expressly understood that such modifications and adaptations are within the spirit and scope of the present invention, and are inclusive, but not limited to the following appended claims as set forth.

What is claimed is:

1. A fastener comprising:
a base connectable to an element;
two tabs extending away from the base on opposite sides of the base, each tab extending away from the base at an angle greater than 90 degrees, the tabs being movable between the angle greater than 90 degrees relative to the base and a second angle approximately equal to 90 degrees relative to the base;
each of the two tabs defining an aperture through which a marker may pass, the marker connectable to the fastener by passing through the aperture of each of the two tabs, the marker frictionally connectable to the two tabs are at the angle greater than 90 degrees relative to the base, such that when a marker is passed through the aperture of each of the two tabs, the aperture walls are urged against the marker thereby holding the marker in place, the marker being removable when the two tabs are at the second angle approximately equal to 90 degrees relative to the base.

2. The fastener of claim 1 further comprising four tabs, two tabs on one set of opposing sides of the base, and the other two tabs on a second set of opposing sides of the base, each of the four tabs extending away from the base at an angle greater than 90 degrees, the tabs being movable between the angle greater than 90 degrees relative to the base and a second angle approximately equal to 90 degrees relative to the base; and
each of the four tabs defining an aperture through which the marker may pass, the marker connectable to the fastener by passing through the aperture of two opposing of the four tabs.

3. The fastener of claim 1 wherein the fastener and tabs are formed of spring steel having a yield strength ranging from 50 to 150 ksi.

4. The fastener of claim 1 wherein the two tabs extend from the base at with included angle of approximately 20-25 degrees.

5. The fastener of claim 1 further comprising a slot defined by each of the two tabs, the slots aligned with each other such that a band may extend through both of the slots to connect the fastener to the element.

6. The fastener of claim 1 further comprising at least one opening in the base, the opening in the base sized to allow a connector to pass through to hold the base to the element.

7. The fastener of claim 1 wherein the base is downwardly angled.

8. The fastener of claim 7 wherein the base is downwardly angled at an included angle of approximately 175 to 160 degrees.

9. The fastener of claim 1 wherein the apertures of the two tabs are threaded.

10. A fastener assembly comprising:
a base connectable to an element;
at least two tabs extending away from the base on opposite sides of the base, each tab extending away from the base at an angle greater than 90 degrees, the tabs being movable between the angle greater than 90 degrees relative to the base and a second angle approximately equal to 90 degrees relative to the base;
each of the two tabs defining an aperture through which a marker may pass; and
the marker, being an elongate rod passing through the apertures of the tabs, the marker frictionally connected to two of the at least two tabs when the two of the at least two tabs are at the angle greater than 90 degrees relative to the base such that the aperture walls are urged against the marker, the frictional connection preventing movement of the marker, the marker being removable from the two of the at least two tabs when the two of the at least two tabs are at the second angle approximately equal to 90 degrees relative to the base, the marker extending away from the base and the element to which the base may be connected.

11. The fastener assembly of claim 10 further comprising four tabs, two tabs on one set of opposing sides of the base, and the other two tabs on a second set of opposing sides of the base, each of the four tabs extending away from the base at an angle greater than 90 degrees, the tabs being movable between the angle greater than 90 degrees relative to the base and a second angle approximately equal to 90 degrees relative to the base;
each of the four tabs defining an aperture; and wherein the marker is connected to two of the four tabs.

12. The fastener assembly of claim 10 wherein the fastener and tabs are formed of spring steel having a yield strength ranging from 50 to 150 ksi.

13. The fastener assembly of claim 10 wherein the at least two tabs extend from the base at with included angle of approximately 20-25 degrees.

14. The fastener assembly of claim 10 wherein the base is downwardly angled.

15. The fastener assembly of claim 10 further comprising a slot defined by each of the two tabs, the slots aligned with each other such that a band may extend through both of the slots to connect the fastener to the element.

16. The fastener assembly of claim 10 further comprising at least one opening in the base, the opening in the base sized to allow a connector to pass through to hold the base to the element.

17. A fastener assembly comprising:
a base connected to a buryable element;
at least two tabs extending away from the base on opposite sides of the base, each tab extending away from the base at an angle greater than 90 degrees, the tabs being movable between the angle greater than 90 degrees relative to the base and a second angle approximately equal to 90 degrees relative to the base;

each of the two tabs defining an aperture through which a marker may pass; and the marker frictionally connected to two of the at least two tabs when the two of the at least two tabs are at the angle greater than 90 degrees relative to the base such that the aperture walls are urged against the marker, the frictional connection preventing movement of the marker, the marker being removable from the two of the at least two tabs when the two of the at least two tabs are at the second angle approximately equal to 90 degrees relative to the base, the marker extending away from the fastener and the buryable element.

18. The fastener assembly of claim 17 further comprising four tabs, two tabs on one set of opposing sides of the base, and the other two tabs on a second set of opposing sides of the base, each of the four tabs extending away from the base at an angle greater than 90 degrees, the tabs being movable between the angle greater than 90 degrees relative to the base and a second angle approximately equal to 90 degrees relative to the base;

each of the four tabs defining an aperture; and wherein the marker is connected to two of the four tabs.

19. The fastener assembly of claim 17 wherein the fastener and tabs are formed of spring steel having a yield strength ranging from 50 to 150 ksi.

20. The fastener assembly of claim 17 wherein the at least two tabs extend from the base at with included angle of approximately 20-25 degrees.

* * * * *